Nov. 30, 1965     L. M. HERMANN     3,220,062
FRAME FOR AREAL STRUCTURAL MEMBERS, IN PARTICULAR FOR
WINDOWS, DOORS AND THE SASHES THEREOF
Filed Oct. 9, 1962
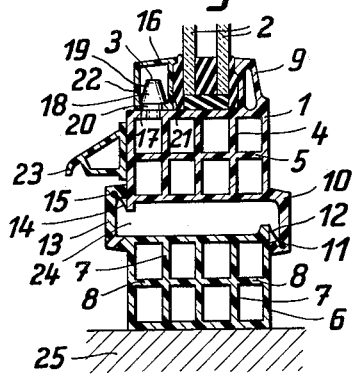
Fig. 1
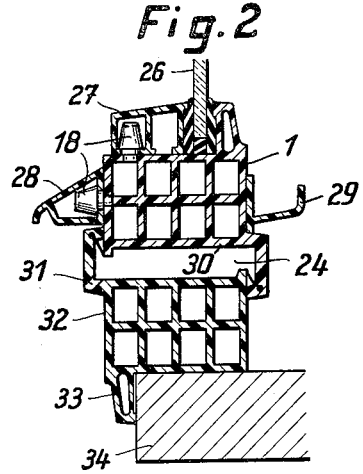
Fig. 2
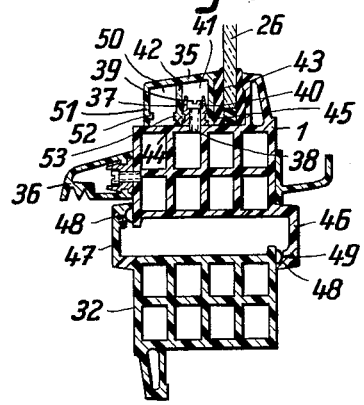
Fig. 3
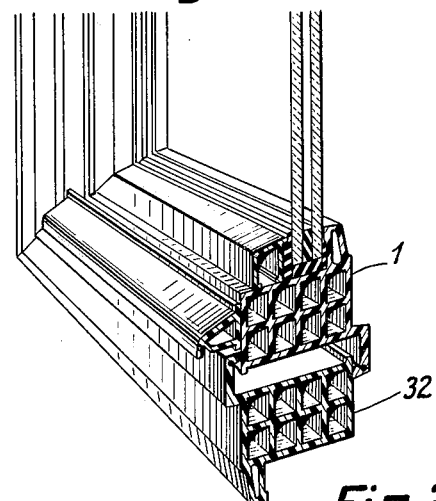
Fig. 4
Fig. 5
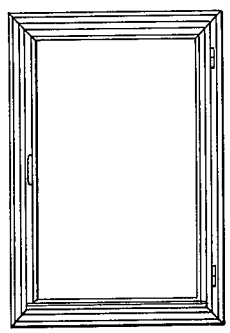
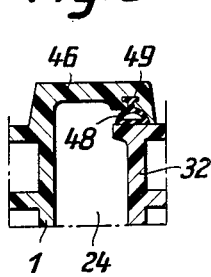
Fig. 6
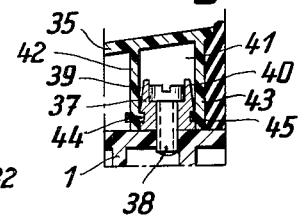
Fig. 7
INVENTOR.
LUDWIG M. HERMANN
BY
Beaman+Beaman
Attys

United States Patent Office 3,220,062
Patented Nov. 30, 1965

3,220,062
FRAME FOR AREAL STRUCTURAL MEMBERS, IN PARTICULAR FOR WINDOWS, DOORS AND THE SASHES THEREOF
Ludwig M. Hermann, Oktaviostrasse 2, Hamburg-Wandsbek, Germany
Filed Oct. 9, 1962, Ser. No. 229,432
Claims priority, application Germany, Oct. 13, 1961, H 43,883
6 Claims. (Cl. 20—11)

The invention relates to a frame for areal structural members in particular for windows, doors and the sashes thereof.

Such frames have until recently been made exclusively of wood. It is, however, known as well to make these frames using metal, in particular light-weight metal, or plastics.

The known solutions to the problem connected with the manufacture of such frames using plastics were, however, not fully satisfactory.

In accordance with the present invention, the frame is composed exclusively of individual lengths of hollow profiles made of plastics and produced in an extrusion operation, the self-contained hollow profile of which comprises at least one transverse reinforcing web longitudinally extending inside thereof, said web being produced along with the hollow profile in one and the same operational step. In this manner, a frame made of plastics is provided which may be designed to be as rigid as desired and need not be reinforced with any additional girders consisting of other material. This results not only in considerably reducing the manufacturing costs but the danger of a premature destruction by corrosion, rottening or the like is eliminated, too. The configuration of the hollow profile per se may be selected ad libitum, although a box profile of an approximately tetragonal cross section is preferred.

Also the number, the arrangement and the configuration of the reinforcing webs and the continuous longitudinally extending cavities formed in this manner may be selected ad libitum.

The invention is further characterized by a special design of the profiles for fitting the panes, the water rail profiles, and the profiles for the channels to collect and guide the condensed damp on window panes; the special features of these profiles will be explained in the following with the aid of the accompanying drawing.

As plastics, a copolymer which consists of polyvinyl chloride (PVC) and a chlorinated polyolefin or the like has proved to be especially suited. Said material is not inflammable, extremely insensitive to shocks and impact-proof. It is extremely well adapted to be milled, bored or otherwise treated in cutting processes. This material is equally well adapted to be welded and connected by means of an adhesive. The strength values of said material and the resistance thereof against influences by atmospheric agencies are excellent. Finally, this material is excellently suited to be worked up in an extrusion operation which is a decisive prerequisite for the manufacture of the frame made in accordance with the invention. The frame made in accordance with the invention is especially well suited also for use in connection with displaceable partition walls, portals, gates, display window arrangements, pavilions, glass show-cases, blind walls for buildings (so-called curtain walls) etc.

Further improvements and suitable developments will be explained in connection with the attached drawing.

In the drawing,

FIG. 1 shows a sectional view of a window sash frame made in accordance with the invention and a window frame made in accordance with the invention which are fitted to one another, FIG. 2 shows a sectional view similar to that shown in FIG. 1 but of another embodiment of the invention, FIG. 3 shows a sectional view similar to that of FIG. 2 but of still another embodiment of the invention, FIG. 4 is a considerably reduced partial perspective view of a window sash and window frame made in accordance with the invention as shown in FIG. 1, FIG. 5 shows a closed window assembly in a considerably reduced scale and consisting of window sash frame and a window frame, and FIGS. 6 and 7 are enlarged views of details shown in FIG. 3.

Throughout the figures, corresponding parts have been designated with corresponding reference numerals. The window sash frame 1 of FIG. 1 consists of a box-like hollow profile and serves to receive a double or insulating window pane which is referenced 2. The profile is provided for instance with three reinforcing webs 4 extending in parallel with the plane of the window pane and one reinforcing web 5 extending vertically of the plane of the window pane.

The window frame 6 is likewise designed in the form of a box-shaped hollow profile with for instance three webs 7 and one reinforcing web 8 extending vertically thereof.

The window sash frame profile 1 comprises a hollow abutment projection 9 for the window pane and a chamber projection 10 which is provided with a longitudinal groove 11 to receive a sealing ledge 12 provided with a resilient sealing lip and made for instance of plastics such as soft PVC or rubber.

The window frame 6 is provided with a corresponding chamber projection 13 having a sealing ledge 14 provided with a resilient sealing lip and inserted in a groove 15. A longitudinally extending retainer 16 serves to fasten the panes 2, said retainer 16 being likewise formed as a hollow profile made of plastics and provided on its side facing the profile 1 with a longitudinally extending opening 7. Adjacent this opening, a screw bolt 18 is threadably engaged with the frame profile 1, said screw bolt comprising a conical head 19 with a screw slot 3 and a circumferentially extending restriction 20. After the panes 2 have been fitted in a usual manner, the retainer 16 is pushed over the conical heads 19 with the resilient walls 21, 22 of the retainer sliding over the cone and then being retained in the restriction 20 of the screw bolt 18 by corresponding projections.

23 designates a longitudinally extending water rail profile welded or pasted to the outside of the window frame. A chamber 24 is situated between the two profiles 1 and 6 with the distance between the two profiles 1 and 6 being dimensioned very amply, for instance 11–20 mm, so that any commercially available fittings may be arranged within this chamber. 25 designates the wall of the building to which the window frame is attached as usual.

The embodiment in accordance with FIG. 2 differs from that shown in FIG. 1 in that only one single pane 26 is provided as a window pane. In this connection, the window retainer is designed to be twice as broad as the retainer 16. However, the manner in which it is connected with the profile 1 has not been changed; the fastening screws 18 may be inserted in the one or other longitudinally extending continuous chamber. 28 designates a changed water rail profile made of plastics. This profile 28 is fastened to the frame profile by means of a plurality of screw bolts 18 in a manner similar to that as described in connection with the window retainer 16. The inside of the window sash frame 1 has a channel profile 29 of the same plastic material for the damp condensed on the window panes directly welded or pasted thereto. The damp condensed on the window panes reaches via a plurality of bores 30 provided in said profile 29 and in the frame profile 1 the chamber 24 from where it directly reaches the open via bores 31 provided in the window frame profile 32.

Said window frame profile 32 is substantially in correspondence with the profile 6. But it is provided with an abutment projection 33 which is in correspondence with the abutment projection 9 of the profile 1. The profile 32 abuts the wall 34 of the building by this abutment projection 33.

In the embodiment in accordance with FIG. 3, the window retainer 35 and the water rail profile 36 are designed and connected with the frame profile 1 in a slightly different manner. In this embodiment, a ledge 37 made for instance of light-weight metal and extending the length of the profile 1 and the retainer 35, serves this connecting purpose. The ledge might, however, be made as well of plastics. This ledge is connected with the profile 1 by means of a plurality of screws 38 and is provided with two wedging surfaces 39, 40 facing each other. The window retainer 35 comprises two downwardly opening chambers 41, 50 with three walls 42, 43 and 51 provided with projections 44, 45 and 52, 53 which are adapted to engage in corresponding recesses or grooves of the ledge 37. After the pane 26 has been fitted, the window retainer 35 is pushed over the wedged surfaces 39, 40 of the ledge 37 for instance by its two resilient walls 42, 43, until the projections 44, 45 are coming into snapping engagement with the corresponding recesses of the ledge 37.

The connection of the water rail profile 36 with the outside of the window sash frame profile 1 is effected in a corresponding manner.

Closed hose profiles 48 made of rubber or plastics, for instance soft PVC, provided with a T-shaped neck 49 inserted in a corresponding groove of the projections 46, 47 are serving to seal the chamber projection 46 of the profile 1 and the chamber projection 47 of the profile 32 of the embodiment in accordance with FIG. 3.

All the profiles and, in particular, the profiles 1, 6 and 32, are made of plastics in an extrusion operation, with a copolymer of polyvinyl chloride and chlorinated polyethylene or polyolefin, respectively, being in particular employed to produce them.

FIG. 4 shows schematically a frame unit made in accordance with FIG. 1. The frame unit consists of two of each of the profiled lengths 1 and 32, the longitudinal borders of which are mitered. Thereupon the ends are interconnected without the use of any reinforcements, in particular welded or pasted. Naturally, with inside opening windows, both the water rail profile and the channel profile for the damp condensed on the window panes are provided only on the lower frame members.

FIG. 6 shows the hose sealing 48–49 on an enlarged scale while in FIG. 7 the ledge 37 and the adjacent parts are shown enlarged.

What I claim is:

1. A frame for areal structural members composed of a plurality of individual lengths of a first hollow profile made of synthetic plastic, said first hollow profile being of a box-like configuration having opposed walls, integral webs interposed between opposed profile walls and extending the length of said profile, said webs being perpendicularly related to each other and to the associated profile walls and defining a plurality of rectangular cells within said profile, a pane abutting ledge projecting outwardly from the exterior of said first hollow profile extending the length thereof, said lengths being severed from a tube having said first profile including said webs and said pane abutting ledge and manufactured in an extrusion operation, the longitudinal ends of said lengths being mitered and connected one with another by a bonding operation to form said frame, means for retaining a pane structure against said abutting ledge, said pane structure retaining means including a plurality of lengths of a second profile of synthetic plastic having a closed cover wall and at least two resilient side walls to form a longitudinally extending cavity having a longitudinally extending opening on the lower side thereof, said side walls having salients pojecting into said cavity in opposed relation to one another, a plurality of longitudinally extending bars having a wedge-shaped cross-section, means for fastening said bars to said longitudinally extending first hollow profile near said pane abutting ledge, the wider part of said wedge-shaped cross-section being disposed adjacent said first hollow profile, two diametrically opposed recesses provided on said bar below the wider part of said wedge-shaped cross-section for engaging with said salients upon said second longitudinally extending profile being snapped over the wedge-shaped cross-section of said bar for fastening said longitudinally extending second profile on said longitudinally extending first hollow profile.

2. A frame for areal structural members composed of a plurality of individual lengths of a hollow profile made of synthetic plastic, said hollow profile being of a box-like configuration having opposed walls, integral webs interposed between opposed profile walls and extending the length of said profile, said webs being perpendicularly related to each other and to the associated profile walls and defining a plurality of rectangular cells within said profile, a pane abutting ledge projecting outwardly from the exterior of said hollow profile and extending the length thereof, a border projecting outwardly from the exterior of said hollow profile and extending longitudinally the length of said profile, said border and said pane abutting ledge being arranged on opposite sides of said profile, said lengths being severed from a tube having said profile including said webs, said border and said pane abutting ledge and manufactured in an extrusion operation, the ends of said lengths being mitered and bonding means connecting the mitered ends of adjacent lengths one with another to form said frame, a longitudinally extending sealing strip made of elastic material and having a resilient sealing portion of tubular cross section and a substantially T-shaped base portion, and a longitudinally extending substantially T-shaped groove defined in said border for fastening said sealing strip on said border.

3. A frame unit comprising a window frame and a window sash frame, said window frame being composed of a plurality of individual lengths of a first hollow profile made of synethtic plastic and being of a box-like configuration having opposed walls, integral webs interposed between opposed profile walls and extending the length of said profile, said webs being perpendicularly related to each other and to the associated profile walls and defining a plurality of rectangular cells within said profile, a border projecting outwardly from the exterior of said hollow profile and extending longitudinally the length of said first profile, said lengths being severed from a tube having said first profile including said webs and said border and manufactured in an extrusion operation, the ends of said lengths being mitered, bonding means connecting the mitered ends of adjacent lengths one with another to form said window frame, a longitudinally extending sealing strip made of elastic material and having a resilient sealing portion of tubular cross-section, a longitudinally extending groove defined in said border for fastening said sealing strip on said border, said window sash frame being composed of a plurality of individual lengths of a second hollow profile made of synthetic plastics, said second hollow profile comprising at least two reinforcing webs extending transversely and longitudinally the length of the interior of said profile, a pane abutting ledge projecting outwardly from the exterior of said second hollow profile and extending longitudinally the length of said second profile, a border projecting outwardly from the exterior of said second hollow profile and extending longitudinally the length thereof, said border and said pane abutting ledge being arranged on opposite sides of said second profile, said lengths being severed from a tube having said second profile including said webs, said border and said pane abutting ledge and manufactured in an extrusion operation, the ends of said lengths being connected one with another to form said window sash frame, a longitudinally extending sealing strip made of elastic material and having a resilient sealing portion of tubular cross-section, a longitudinally extending groove defined in said border for fastening said sealing strip on said border, said border of said window frame and said border of said window sash frame being directed one against another to form a chamber adapted to receive window fittings, the sealing strip of said window frame adapted to bear against said window sash frame and the sealing strip of said window sash frame adapted to bear against said window frame.

4. A frame unit as claimed in claim 3 in which said window frame includes a pane abutting ledge projecting from the exterior of the hollow profile of said window frame, said first hollow profile and said second hollow profile being identical in configuration.

5. A frame for areal structure members composed of a plurality of individual lengths of a first hollow profile made of synthetic plastic, said first hollow profile being of a box-like configuration having opposed walls, integral webs interposed between opposed profile walls and extending the length of said profile, said webs being perpendicularly related to each other and to the associated profile walls and defining a plurality of rectangular cells within said profile, said lengths being severed from a tube having said first profile including said webs and manufactured in an extrusion operation, the ends of said lengths being mitered, bonding means connecting the mitered ends of adjacent lengths one with another to form said frame, at least one length of a second profile of synthetic plastic adapted to serve as a water rail profile and arranged on the outer side of said frame, said second profile having two resilient walls to form at least a longitudinally extending cavity having a longitudinally extending opening on the one side thereof, said side walls having salients projecting into said cavity against one another, at least one longitudinally extending bar having a wedge-shaped cross-section, means for fastening said bar to said longitudinally extending first hollow profile, the wider part of said wedge shaped cross-section being disposed adjacent said first hollow profile, two diametrically opposed recesses provided on said bar below the wider part of said wedge-shaped cross-section for engaging with said salients when said second longitudinally extending profile being snapped over the wedge-shaped cross-section of said bar for fastening said second longitudinally extending profile on said first longitudinally extending hollow profile.

6. A frame for areal structural members composed of a plurality of individual lengths of a first hollow profile made of synthetic plastic, said first hollow profile being of a box-like configuration having opposed walls, integral webs interposed between opposed profile walls and extending the length of said profile, said webs being perpendicularly related to each other and to the associated profile walls and defining a plurality of rectangular cells within said profile, a pane abutting ledge projecting outwardly from the exterior of said first hollow profile and extending the length thereof, said lengths being severed from a tube having said first profile including said webs and said pane abutting ledge and manufactured in an extrusion operation, the longitudinal ends of said lengths being mitered and connected one with another by a bonding operation to form said frame, means for retaining a pane structure against said abutting ledge, said pane structure retaining means including a plurality of lengths of a second profile of synthetic plastic having a closed cover wall and at least two resilient side walls to form a longitudinally extending cavity having a longitudinally extending opening on the lower side thereof, said side walls having salients projecting into said cavity in opposed relation to one another, a plurality of screw bolts each having a cone-shaped head for connecting each of said lengths of said second profile to said longitudinally extending first hollow profile near said pane abutting ledge, the wider part of said cone-shaped head being directed toward said first profile, a circumferential recess provided on said cone-shaped head below the wider part thereof for engaging with said salients when said second longitudinally extending profile being snapped over said cone-shaped head for fastening said longitudinally extending second profile on said longitudinally extending first hollow profile.

References Cited by the Examiner

UNITED STATES PATENTS

| | | | |
|---|---|---|---|
| 2,871,524 | 2/1959 | Willie et al. | 20—56.4 |
| 2,984,299 | 5/1961 | Vallarelli et al. | 20—53 X |
| 3,031,049 | 4/1962 | Somville | 189—78 |

FOREIGN PATENTS 1,241,035  8/1960  France.

OTHER REFERENCES

Hartmann et al., German Application 1,034,347, printed 7-17-58.

HARRISON R. MOSELEY, *Primary Examiner.*

BENJAMIN BENDETT, *Examiner.*